United States Patent
Aarni et al.

(10) Patent No.: US 9,514,472 B2
(45) Date of Patent: Dec. 6, 2016

(54) METHOD AND APPARATUS FOR CLASSIFYING CONTENT

(75) Inventors: Ville Aarni, Veikkola (FI); Miikka Sainio, Kerava (FI); Niklas Tony Von Knorring, Espoo (FI); Dmitry Kolesnikov, Vantaa (FI); Atte Tapio Lahtiranta, Bedford, MA (US)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1009 days.

(21) Appl. No.: 12/487,438

(22) Filed: Jun. 18, 2009

(65) Prior Publication Data

US 2010/0325583 A1 Dec. 23, 2010

(51) Int. Cl.
*G06F 3/048* (2013.01)
*G06Q 30/02* (2012.01)
*G06F 17/30* (2006.01)

(52) U.S. Cl.
CPC ..... *G06Q 30/0203* (2013.01); *G06F 17/30038* (2013.01); *G06Q 30/02* (2013.01)

(58) Field of Classification Search
CPC .............. G06F 3/04847; G06F 3/04855; G06F 17/30038; G06Q 30/02; G06Q 30/0203
USPC ........................................................ 715/833
See application file for complete search history.

(56) References Cited

U.S. PATENT DOCUMENTS

| | | | |
|---|---|---|---|
| 5,615,347 A * | 3/1997 | Davis ................. | G06F 3/04847 715/804 |
| 5,616,876 A * | 4/1997 | Cluts ................. | G06F 17/30749 348/E7.071 |
| 6,463,431 B1 | 10/2002 | Schmitt | |
| 6,539,395 B1 * | 3/2003 | Gjerdingen ....... | G06F 17/30743 |
| 7,415,449 B2 * | 8/2008 | Zhong .............. | G06F 17/30707 706/55 |
| 7,937,417 B2 | 5/2011 | Seymour | |
| 7,953,735 B2 | 5/2011 | Yamamoto et al. | |
| 2004/0054572 A1 * | 3/2004 | Oldale .............. | G06F 17/30699 706/1 |

(Continued)

FOREIGN PATENT DOCUMENTS

| | | |
|---|---|---|
| GB | 2 455 331 A | 6/2009 |
| JP | 2001209660 A | 8/2001 |

(Continued)

OTHER PUBLICATIONS

Building an Interactive Next-Generation Artist Recommender Based on Automatically Derived High-Level Concepts, Pohle et al., Proceedings of the 2007 International Workshop on Content-Based Multimedia Indexing (CBMI'2007), Jun. 25-27, 2007, Bordeaux, France, IEEE, pp. 336-343.

(Continued)

*Primary Examiner* — Anil Bhargava
(74) *Attorney, Agent, or Firm* — Core Wireless Licensing, Ltd.

(57) ABSTRACT

An approach is provided for receiving, in association with first content to be rendered on user equipment, a vector of one or more values for a corresponding one or more sliding scales. A determination is made of a relationship of the first content to second content based, at least in part, on the vector received. Each value of the vector represents a relative position along a corresponding sliding scale between a minimum label and a maximum label for the sliding scale.

17 Claims, 7 Drawing Sheets

(56) References Cited

U.S. PATENT DOCUMENTS

| | | | |
|---|---|---|---|
| 2005/0092161 A1 | 5/2005 | Urata | |
| 2005/0171940 A1 | 8/2005 | Fogg et al. | |
| 2007/0112792 A1* | 5/2007 | Majumder | G06F 17/30867 |
| 2007/0179924 A1* | 8/2007 | Zhong | G06F 17/30707 |
| | | | 706/55 |
| 2008/0162468 A1 | 7/2008 | Frohlich et al. | |
| 2008/0168055 A1* | 7/2008 | Rinearson | G06F 17/30997 |
| 2008/0243794 A1 | 10/2008 | Tanaka et al. | |
| 2009/0077499 A1* | 3/2009 | Svendsen | G06F 17/30035 |
| | | | 715/833 |
| 2009/0292732 A1* | 11/2009 | Manolescu | G06F 17/30026 |
| 2010/0031157 A1* | 2/2010 | Neer | G06Q 10/06 |
| | | | 715/738 |

FOREIGN PATENT DOCUMENTS

| | | |
|---|---|---|
| JP | 2003030232 A | 1/2003 |
| JP | 2005010771 A | 1/2005 |
| JP | 2007035108 A | 2/2007 |
| WO | 2006/134866 | 12/2006 |
| WO | WO 2009/068972 A1 | 6/2009 |

OTHER PUBLICATIONS

International search report and written opinion for corresponding international application No. PCT/FI2010/050468 dated Nov. 11, 2010, pp. 1-14.

* cited by examiner

METHOD AND APPARATUS FOR CLASSIFYING CONTENT

BACKGROUND

Content sharing applications have been one of the most widely used and popular applications over the Internet. At the same time, the use of wireless communication devices has become pervasive, and is rapidly overtaking the use of traditional wired devices. As a result, much content is rendered on mobile devices. To provide a satisfactory user experience, many service providers attempt to recommend relevant content to a user based on past purchases and renderings by the user or past purchases and renderings by known contacts of the user. Content is usually classified and relevance determined for recommendations based on metadata that names the content and describes the content, such as by artist name, performance date, and genre tags. However, values for these metadata parameters are often too specific or too coarse or too difficult to translate effectively into enough different languages to provide nuanced recommendations that are more helpful for the user and service providers to administer.

SOME EXAMPLE EMBODIMENTS

Therefore, there is a need for an approach for robust, flexible classification of content to be rendered on user equipment.

According to one embodiment, a method comprises receiving, in association with first content to be rendered on user equipment, a vector of one or more values for a corresponding one or more sliding scales. The method also comprises determining a relationship of the first content to second content based, at least in part, on the vector received. Each value of the vector represents a relative position along a corresponding sliding scale between a minimum label and a maximum label for the sliding scale.

According to another embodiment, an apparatus comprising at least one processor, and at least one memory including computer program code, the at least one memory and the computer program code configured to, with the at least one processor, cause the apparatus to receive, in association with first content to be rendered on user equipment, a vector of one or more values for a corresponding one or more sliding scales. The apparatus is also caused to determine a relationship of the first content to second content based, at least in part, on the vector received. Each value of the vector represents a relative position along a corresponding sliding scale between a minimum label and a maximum label for the sliding scale.

According to another embodiment, a computer-readable storage medium carrying one or more sequences of one or more instructions which, when executed by one or more processors, cause an apparatus to receive, in association with first content to be rendered on user equipment, a vector of one or more values for a corresponding one or more sliding scales. The apparatus is also caused to determine a relationship of the first content to second content based, at least in part, on the vector received. Each value of the vector represents a relative position along a corresponding sliding scale between a minimum label and a maximum label for the sliding scale.

According to another embodiment, an apparatus comprises means for receiving, in association with first content to be rendered on user equipment, a vector of one or more values for a corresponding one or more sliding scales. The apparatus also comprises means for determining a relationship of the first content to second content based, at least in part, on the vector received. Each value of the vector represents a relative position along a corresponding sliding scale between a minimum label and a maximum label for the sliding scale.

According to another embodiment, a method comprises facilitating access to receive, in association with first content to be rendered on user equipment, a vector of one or more values for a corresponding one or more sliding scales, and to transmit data indicating a relationship of the first content to second content based, at least in part, on the vector received. Each value of the vector represents a relative position along a corresponding sliding scale between a minimum label and a maximum label for the sliding scale.

According to another embodiment, an apparatus comprises means for facilitating access to receive, in association with first content to be rendered on user equipment, a vector of one or more values for a corresponding one or more sliding scales, and to transmit data indicating a relationship of the first content to second content based, at least in part, on the vector received. Each value of the vector represents a relative position along a corresponding sliding scale between a minimum label and a maximum label for the sliding scale.

According to yet another embodiment, a computer-readable storage medium carrying one or more sequences of one or more instructions which, when executed by one or more processors, cause an apparatus to facilitate access to receive, in association with first content to be rendered on user equipment, a vector of one or more values for a corresponding one or more sliding scales, and to transmit data indicating a relationship of the first content to second content based, at least in part, on the vector received. Each value of the vector represents a relative position along a corresponding sliding scale between a minimum label and a maximum label for the sliding scale.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for robust, flexible classification of content are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
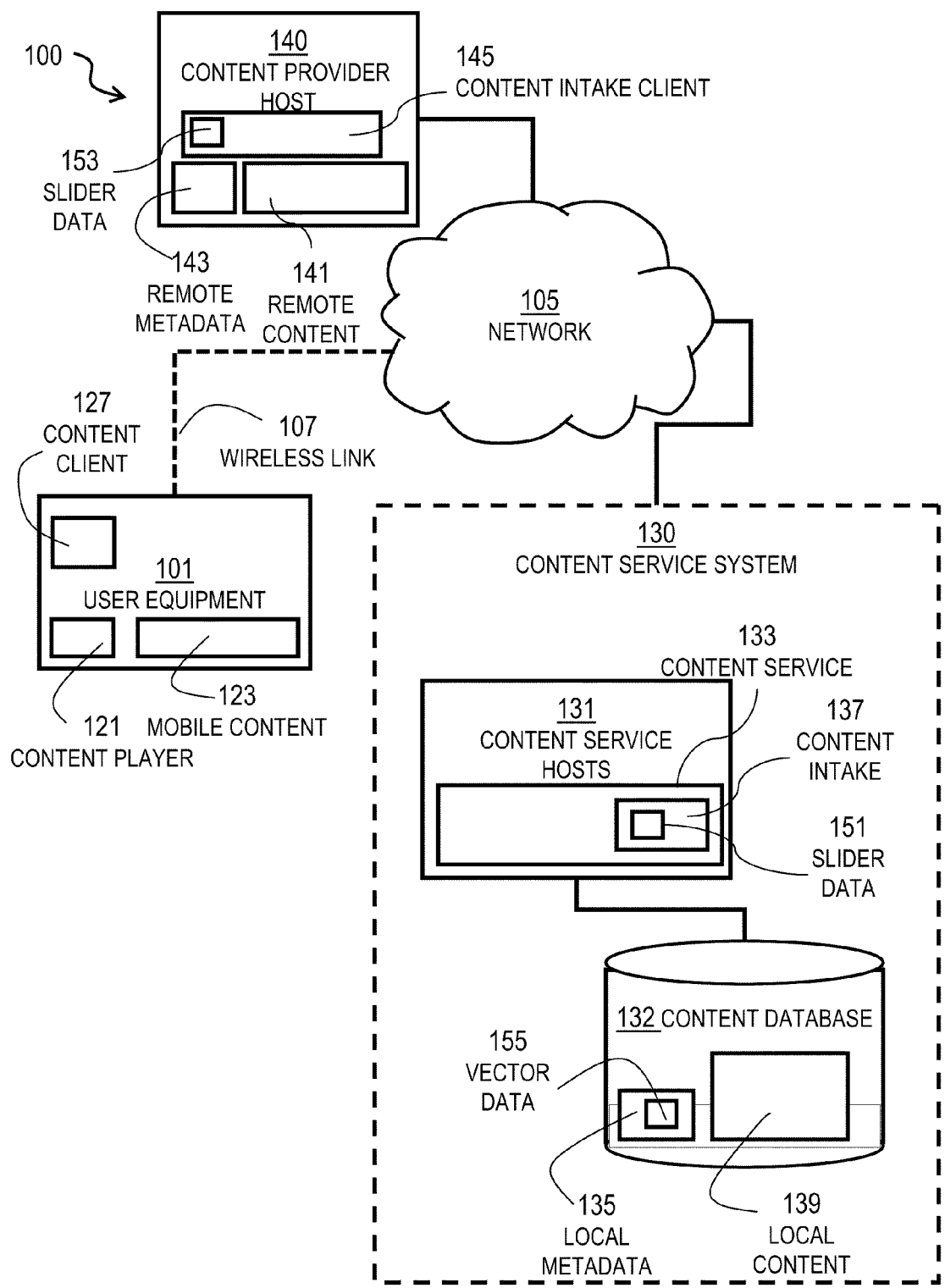
FIG. 1 is a diagram of a system capable of robust, flexible classification of content, according to one embodiment.

FIG. 1 is a diagram of a system 100 capable of robust, flexible classification of content, according to one embodiment. Content is usually classified and relevance determined for recommendations based on metadata that names the content and describes the content, such as by artist name, performance date, and genre tags. However, values for these metadata parameters are often too specific or too coarse or too difficult to translate effectively into enough different languages to provide nuanced recommendations that are more helpful for the user. For example, tags have several disadvantages because tags need to be localized to each language separately, and a content provider must define a huge number of tags when the content is intended to support tens of languages. Further if the tags are freely definable it is difficult to ensure that tags of two similar items are the same because there might be translation problems.

By providing a means to classify content numerically on one or more standard sliding scales, the system 100 allows better classification and determinations of relevance for content to be rendered for worldwide subscribers to a service, e.g., on devices such as communication devices. Sliders make it possible to determine a limited set of descriptive values which are common across all items, i.e. allow a common "vocabulary" to be achieved. Thus the limited vocabulary set of the sliders allows the creation of content classification for relevancy engine using language and region agnostic methods. In some embodiments, the multiple pairs of minimum and maximum labels are formed (or stored or translated at time of presentation) for the same scale, each pair of labels in a different language. Then, based on user preferences or context (e.g., language of words in email or text messages sent by user), the minimum and maximum labels in the appropriate language are presented for a given sliding scale. The resulting numeric position data then has the same meaning regardless of language of the user.

As used herein, the terms content or media refer to any digital data that can be presented for human perception, for example, digital sound, songs, digital images, digital games, digital maps, point of interest information, digital videos (such as music videos, news clips and theatrical videos), advertisements, ringtones, program files or objects, any other digital media or content, or any combination thereof. The term rendering indicates any method for presenting the content to a human user, including playing music through speakers, displaying images on a screen or in a projection or on tangible media such as photographic or plain paper, showing videos on a suitable display device with sound, graphing game or map data, music or video playback or streaming, games playing, image or map displaying, radio or television content broadcasting or streaming, or any other term of art for presentation, or any combination thereof.

As shown in FIG. 1, the system 100 comprises a user equipment (UE) 101 having connectivity to a content service system 130 via a communication network 105. Likewise, the content service system 130 has connectivity with a content provider host 140 via communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). In the illustrated embodiment, the UE 101a mobile terminal connected to network 105 by wireless link 107. The UE 101 is configured with processes and data structures to allow the purchase and rendering of content. Mobile content data structure 123 holds data for content cached locally on the UE 101, and content player process 121 allows the rendering of contents, such as content in mobile content data structure 123. Also included on UE 101 is a content client process 127 that obtains content from a content service system 130, described in more detail below.

By way of example, the UE 101 and content service system 130 communicate with each other and other components of the communication network 105 using well known, new or still developing standard or proprietary protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process can be divided up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the Hypertext Transfer Protocol (HTTP) with any of a large number of servers called World Wide Web servers that provide web pages.

The content client 127 interacts with servers of the content service system 130. As depicted in FIG. 1, one or more hosts 131 in content service system 130 include content service 133 as a server. The content service hosts 131 may be in different locations in or connected to network 105. Content service 133 provides services related to providing content to one or more registered users of network 105 for rendering on user equipment, e.g. UE 101. Data holding content and metadata describing the content are stored in local content data structure 139 and local metadata data structure 135, respectively, in content database 132.

Some content for the local content data structure 139 comes from remote content providers, such as the content provider's host 140 that includes data structures 141 and 143 for remote content and corresponding remote metadata, respectively. As depicted, the content service 133 includes a content intake module 137 for obtaining content and metadata about that content to store in data structures 139 and 135, respectively. As illustrated, the content intake module 137 is a server for a content intake client 145 on content provider host 140.

According to an illustrated embodiment, the content intake module includes slider data 151, described in more detail with reference to FIG. 2. The content intake module 137 sends some or all of the slider data 151 to the content intake client 145 as slider data 153. Any protocol may be used to send the slider data, such as a Web page transported as an HTTP message. Values resulting from the content provider operation of the sliders form a vector used to describe the content, and the vector is stored by the content intake module 137, e.g., in vector data structure 155 in the local metadata data structure 135.

Although a particular set of host nodes, processes, and data structures are shown in FIG. 1 for purposes of illustration, in various other embodiments more or fewer nodes, processes and data structures are involved. Furthermore, although processes and data structures are depicted as particular blocks in a particular arrangement for purposes of illustration, in other embodiments each process or data structure, or portions thereof, may be separated or combined or arranged in some other fashion.

Figure 2:
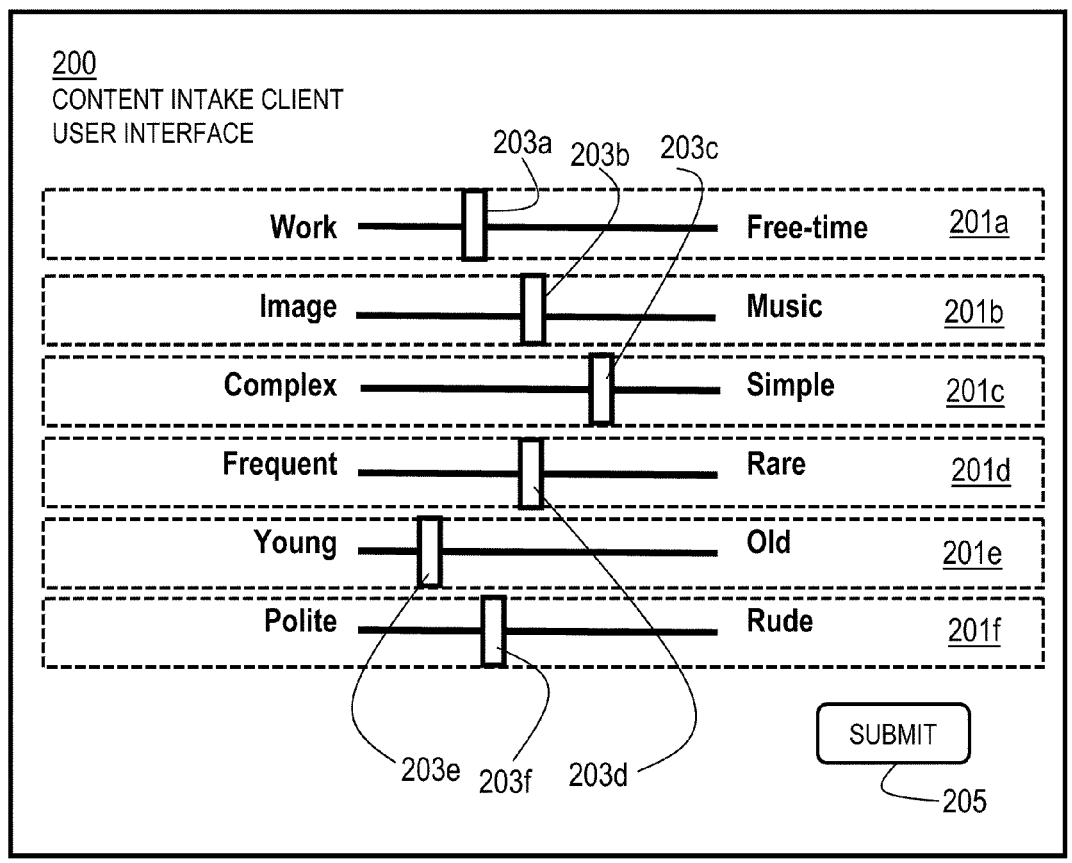
FIG. 2 is a diagram of a user interface for robust, flexible classification of content, according to one embodiment.

FIG. 2 is a diagram of a user interface 200 for robust, flexible classification of content, according to one embodiment. The content intake client user interface 200 is based on slider data 153 sent from the content intake module 137 to the content intake client 145 and is presented to a user of the content provider host by the content intake client. The interface 200 includes multiple sliding scales, e.g., sliding scale 201a, sliding scale 201b, sliding scale 201c, sliding scale 201d, sliding scale 201d and sliding scale 201f, collectively referenced hereinafter as sliding scales 201. Each sliding scale 201 includes a minimum label and a maximum label separated by a horizontal bar. Each sliding scale 201 also includes a graphical indicator called a slider, e.g., slider 203a, slider 203b, slider 203c, slider 203d, slider 203e and slider 203f, respectively, collectively referenced hereinafter as slider 203. The slider 203 is moved by a user, e.g., using a pointing device, to indicate a relative position along the horizontal bar between the minimum label and the maximum label for the sliding scale. In the illustrated embodiment, the content intake client user interface 200 includes a submit button 205.

A user of user interface 200, e.g., a human who provides content for the content service system 130, uses a pointing device to move the sliders 203 between the minimum label and the maximum label. To distinguish the user of host 140 from the user of UE 101, the former is called a publisher and the later is called a consumer, hereinafter. When the sliders are positioned to the satisfaction of the publisher, the publisher causes the submit button 205 to be activated. As a result, the six values for the positions of the six sliders are sent to the content intake module 137. The six values constitute a single vector of six elements, also called a six-dimensional vector. The vector of values is received by the content intake module 137 along with the content and associated metadata from the content provider host; and the vector is stored with the metadata in association with the content. For example, the vector of values is stored in vector data structure 155 in local metadata data structure 135 with other metadata is association with the content stored in the local content data structure 139.

Any number of sliding scales with any pairs of maximum and minimum labels may be used to characterize the content. For purposes of illustration, six example sliding scales are used. For scale 201a, the minimum value (leftmost allowed position of slider 203a) corresponds to content for use at work only, while the maximum value (rightmost allowed position of slider 203a) corresponds to content for use only during free-time for the consumer. The position of the slider along the scale can be determined with any degree of precision (granularity), e.g., from 25% of the total range to about 0.5% of the total range or better. In one embodiment, the position is expressed as an integer between 0 for the leftmost position to a maximum value for the rightmost value. The granularity of the position thus depends on the maximum integer. For example, a maximum integer of 3, gives the relative position only to within about 25%, while a maximum integer of 255 gives the relative position within about 0.4%. The granularity (e.g., largest integer), is different for different sliding scales in some embodiments. It is contemplated that any number of sliding scales 201 and any pair of labels may be used, depending on the application. For purposes of illustration, it is assumed that six sliding scales depicted in FIG. 2 are employed to describe content using label pairs: (work, free-time); (image, music); (complex, simple); (frequent, rare); (young, old); and (polite, rude) respectively. It is further assumed that values range from 0 to 7 for all six sliding scales. It is further assumed that the six-dimensional vector generated by the depicted relative positions of the six sliders 203 is (3, 4, 5, 4, 2, 3). When the publisher activates the submit button, e.g., by placing a cursor over the button with a pointing device and pressing a sensitive surface, the vector (3, 4, 5, 4, 2, 3) is sent to the content intake module, e.g., module 137. This vector is stored with the metadata for the content, e.g., in vector data structure 155.

As mentioned, although various embodiments are described with respect to a particular interface with six sliding scales describing content with specific labels, it is contemplated that the approach described herein may be used with other numbers of sliding scales and interfaces representing relative position along the scale between the same or different pair of labels. Each pair of labels includes a minimum label associated with a minimum position along the scale and a maximum label associated with a maximum position along the scale.

Figure 3:
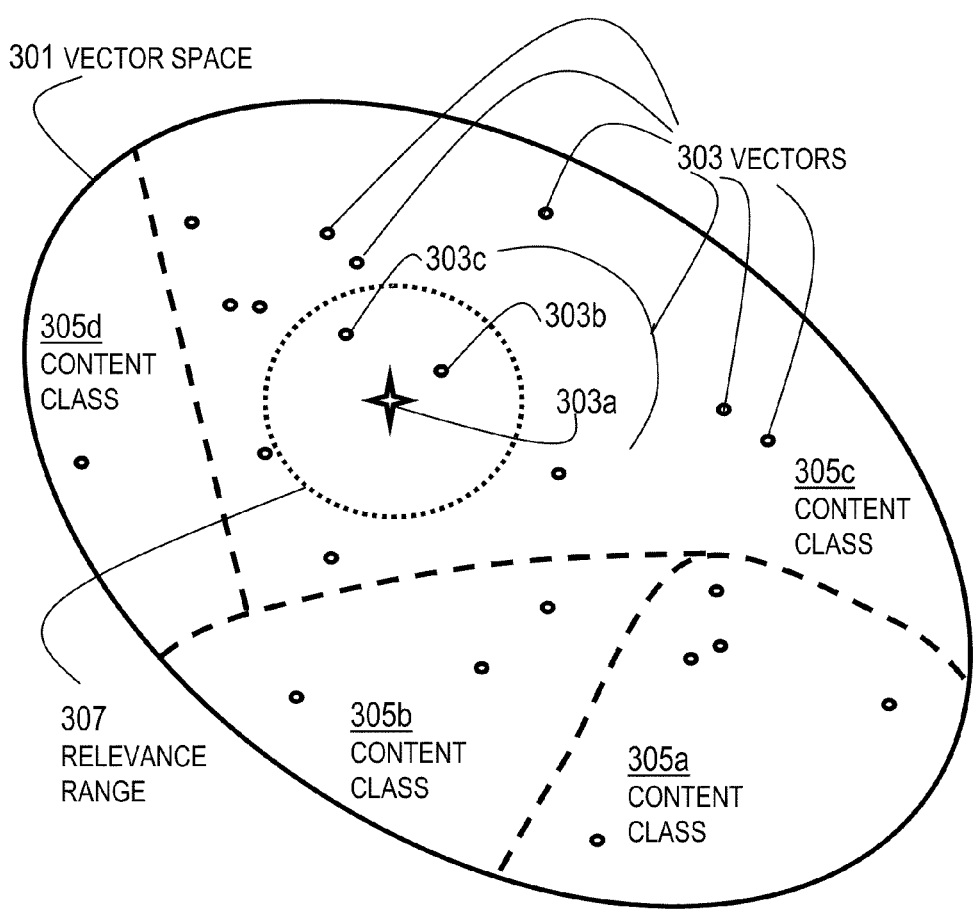
FIG. 3 is a diagram of vector space for robust, flexible classification of content, according to one embodiment.

The vector associated with each content may be used to classify the content and determine the relevance of the content to the preferences of a consumer, e.g., the user of UE 101. FIG. 3 is a diagram of vector space for robust, flexible classification of content, according to one embodiment. The vector space 301 is a Venn diagram representing all possible values for the vectors of values from the sliding scales used. In the illustrated embodiment, vector space 301 represents all six dimensional vectors with a granularity of 8 (0 to 7) for each dimension ($8^6$=262.144 possible vectors). It is assumed that the vector derived from the slider positions depicted in FIG. 2 for the first content is vector 303a indicated by a four pointed star. Other vectors for other content are represented by dots 303b, 303c, and others, collectively referenced herein as vectors 303. The vector space 301 can be divided into different subspaces, each representing a different class of content. As depicted in FIG. 3, the vector space 301 is divided into four classes: content class 305a, content class 305b; content class 305c; and content class 305d. Content is classified by the class into which its vector falls. For example, vector 303a is in content class 305c.

Relevance of content to other content is useful if a recommendation is to be made to a consumer based on content the consumer is currently or has recently rendered or purchased. Such relevance can also be based on the distance between the vectors associated with the contents. Distance between vectors can be determined using any of several norms widely known in linear mathematics, such as an order zero distance) ($l^0$) given by the difference of the largest elements of the two vectors, or an order one distance ($l^1$) given by the sum of the absolute values of the differences of the six coordinate values between the two vectors, or the Euclidean distance ($l^2$) given by the square root of the sum of the squares of the differences in coordinate values. Not every dimension need be given the same weight in computing the distance. Thus, a relationship of first content to second content is based, at least in part, on the vector of values received, e.g., either by classification or by relevance.

For example, content is considered relevant to a user who indicated an interest in content with vector 303a, if the vector of that other content falls within a relevance range 307 given by the dotted circle in FIG. 3. Contents associated with vector 303b and vector 303c are therefore considered relevant to a user who recently purchased or rendered content associated with vector 303a.

In some embodiments slider position is based on sensing the device state. For example, a calendar entry indicates that today is the day of my birthday party. Consequently, a slider on a "Office/Home" labeled scale is positioned to home. For another example, various sensors are tracked and a conclusion is made on the tracked result so that the slider position on the scale will change. For example, the device includes a sports-tracker application with GPS and heart rate options active. In this embodiment, a slider on a "Work/Leisure" labeled scale is positioned to leisure. In various embodiments, there are other context sensing logic in device, in any combination. For example, the type of music the user is currently listening to from a music application is used to set the initial slider positions for one or more sliding scales.

In some embodiments, two or more of the sliding scales are interlocked so that sliders move concurrently when the user inputs a change to any of the sliders on the interlocked scales. In some embodiments two or more scales are locked or unlocked based on the desires and needs of an application, e.g., in some inputs e.g. only one slider needs to be moved. When a slider on one of the interlocked scales is moved, the sliders on the one or more other interlocked scales will also move, either in the same direction or oppositely or at a different rate, faster or slower, or in some combination of related movement.

In some embodiments, the slider positions provided by a user means that the purchasing application linked to the sliding scales will change and an offering or appearance of the purchasing application changes. For example, user supplied slider positions influence the list of items in the recommendation tab in user's device.

Figure 4:
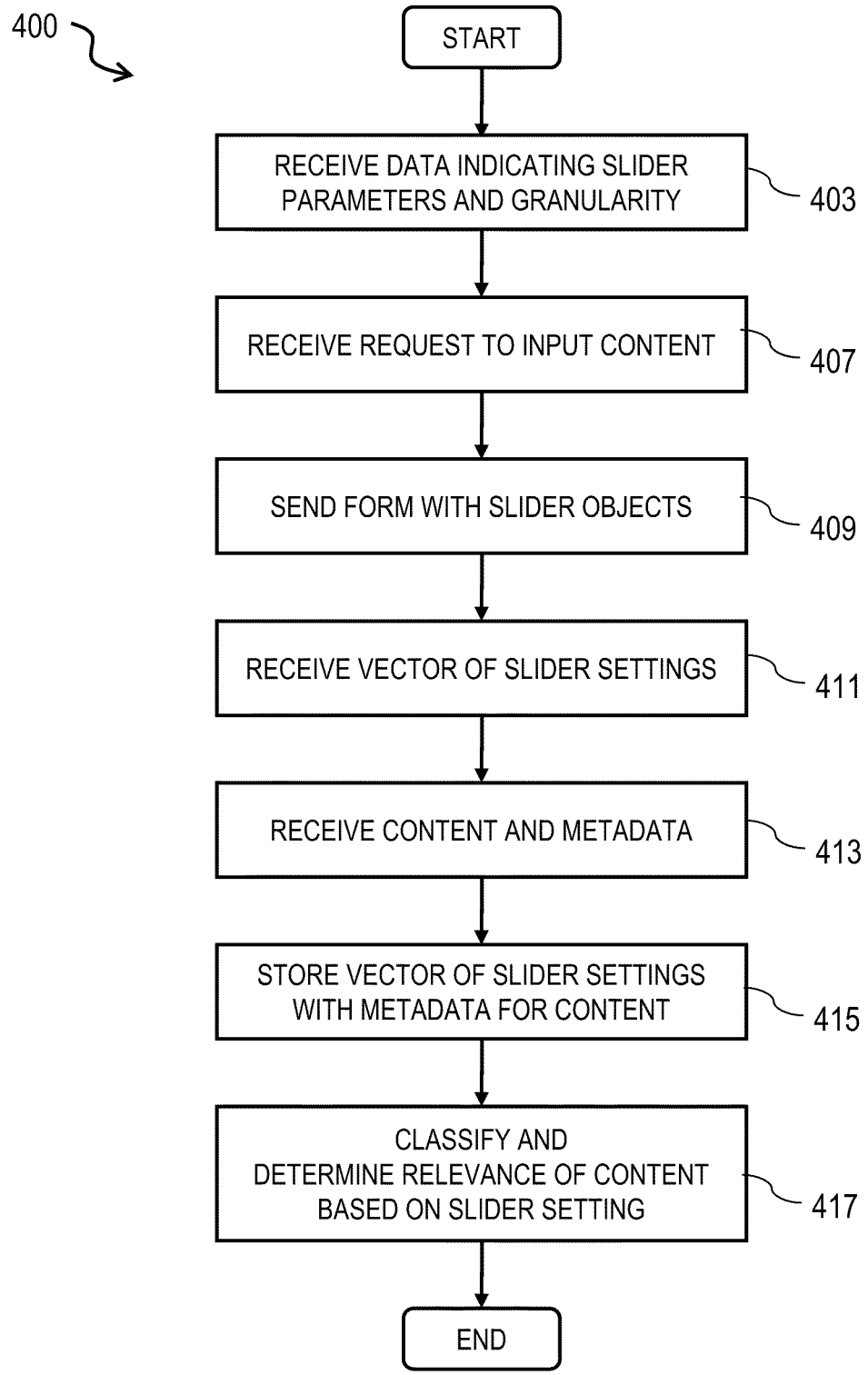
FIG. 4 is a flowchart of a process for robust, flexible classification of content, according to one embodiment.

FIG. 4 is a flowchart of a process 400 for robust, flexible classification of content, according to one embodiment. In one embodiment, the content intake module 137 performs the process 400 and is implemented in, for instance, a chip set including a processor and a memory as shown FIG. 6. The process 400 may be executed on a single node, such as one of the content service hosts 131, or can be divided among two or more nodes, e.g., more than one host of content service hosts 131. A server is considered to receive data from a user (e.g., the consumer or publisher) operating at a different device by receiving messages sent from a client process on the device operated by the user. Similarly, a server is considered to initiate presentation of data on a different device by sending, to a client process on the different device, data to be presented on that device. Although steps in FIG. 4 are shown in a particular order for purposes of illustration, in other embodiments, one or more steps may be performed in a different order or overlapping in time, in series or in parallel, or one or more steps may be omitted or added, or changed in some combination of ways.

In step 403, slider data is received that indicates the number of sliding scales, the parameter represented by each scale, the minimum and maximum labels for the parameter, and the granularity for determining the relative position (e.g., the number of binary digits, bits, or the maximum integer). Any method may be used to receive this data. For example, in various embodiments, the data is included as a default value in software instructions, is received as manual input from a service administrator on the local or a remote node, is retrieved from a local file or database, or is sent from a different node on the network, either in response to a query or unsolicited, or the data is received using some combination of these methods.

Any number of sliding scales and any corresponding parameters may be received in step 407. In some embodiments, the set of sliding scales (defined by the number of sliding scales and for each a parameters with corresponding labels and granularity) is different for different types of content (e.g., different sets for ringtones, games, music, and video). In some embodiments, minimum and maximum labels for one or more languages for each sliding scale, as described above, are received in step 407.

In step 407, a request is received from a publisher to input content into the service, i.e., to publish content. Any method may be used to receive this request. For example, in some embodiments, the request is expressed in an HTTP message from a browser on the content provider host 140, or from a browser within the content intake client 145, to a Web server interface in the content intake module 137.

In step 409, a form is sent with slider objects. For example a web page is sent that includes graphical elements to serve as a sliding scale with a user controlled slider. In some embodiments, a slider object is a combination of data and methods expressed as computer instructions used to render the sliders of the user interface, e.g., as depicted in FIG. 2.

In step 411, a vector of slider settings (i.e., values for relative positions) is received based on input from a publisher of content to be published. Any method may be used to receive this data. For example, the data is sent as an XML document embedded in another protocol, such as HTTP.

In step 413, the content to be published and the other metadata for the content is also received. Any method may be used to receive these data. For example, the content is sent as a filename, and the file of that name is later transferred into local content data structure 139 using a file transfer protocol; while the metadata is sent as an XML document embedded in another protocol, such as HTTP. In some embodiments, the metadata is sent in the same XML document as the vector in step 411.

In step 415, the vector is stored in association with metadata and the content to be published. For example, the vector is stored in vector data structure 155 in local metadata data structure 135.

In step 417, the published content is classified and determined relevant for a recommendation to a consumer based on the vector of slider settings. For example, the content service 133 classifies published content having vector 303a with other published content in content class 305c, as depicted in FIG. 3. As a further example, content service 133 recommends the published content having vector 303a to a consumer of content associated with vector 303b, because vectors for both contents are within the same relevance range 307.

In some embodiments, a recommendation is made not based on a vector of prior content indicated by the consumer, but on a vector provided by the consumer. For example, in some embodiments, the content service 133 sends sliding scale data 151 to content client 127, which presents the user interface 200 to the consumer rather than to a publisher. The consumer indicates the content of interest by setting the sliders, and the vector of slider setting by the consumer is stored with a user profile, not shown, by the content service 133. Content with vectors in the same class as the consumer vector, or within a relevance range of the consumer vector, are then recommended to the consumer through content client 127. Consumer setting may be based on state of consumer's device or one or more interlocked scales, as described above.

Given the above arrangement and processes for content classification, mobile devices can readily identify particular content. In this manner, the mobile devices, which are system resource constrained, need not engage in unnecessarily consuming system resources (e.g., power and processing) by seeking the desired content.

The processes described herein for providing robust, flexible classification of content may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
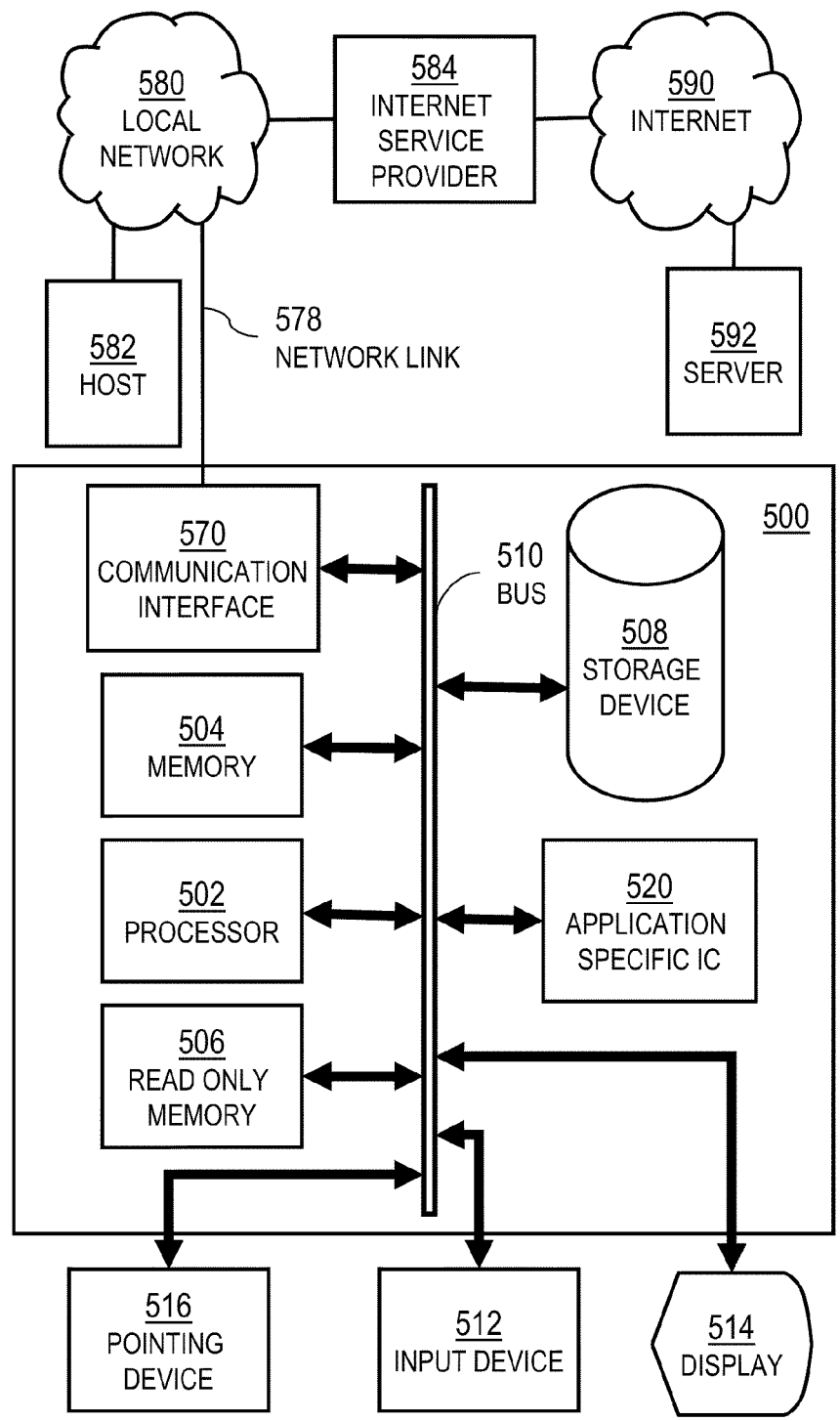
FIG. 5 is a diagram of hardware that can be used to implement an embodiment of the invention.

FIG. 5 illustrates a computer system 500 upon which an embodiment of the invention may be implemented. Computer system 500 is programmed (e.g., via computer program code or instructions) for robust, flexible classification of content as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related robust, flexible classification of content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for robust, flexible classification of content. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for robust, flexible classification of content, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for robust, flexible classification of content for recommendation to the UE 101.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Figure 6:
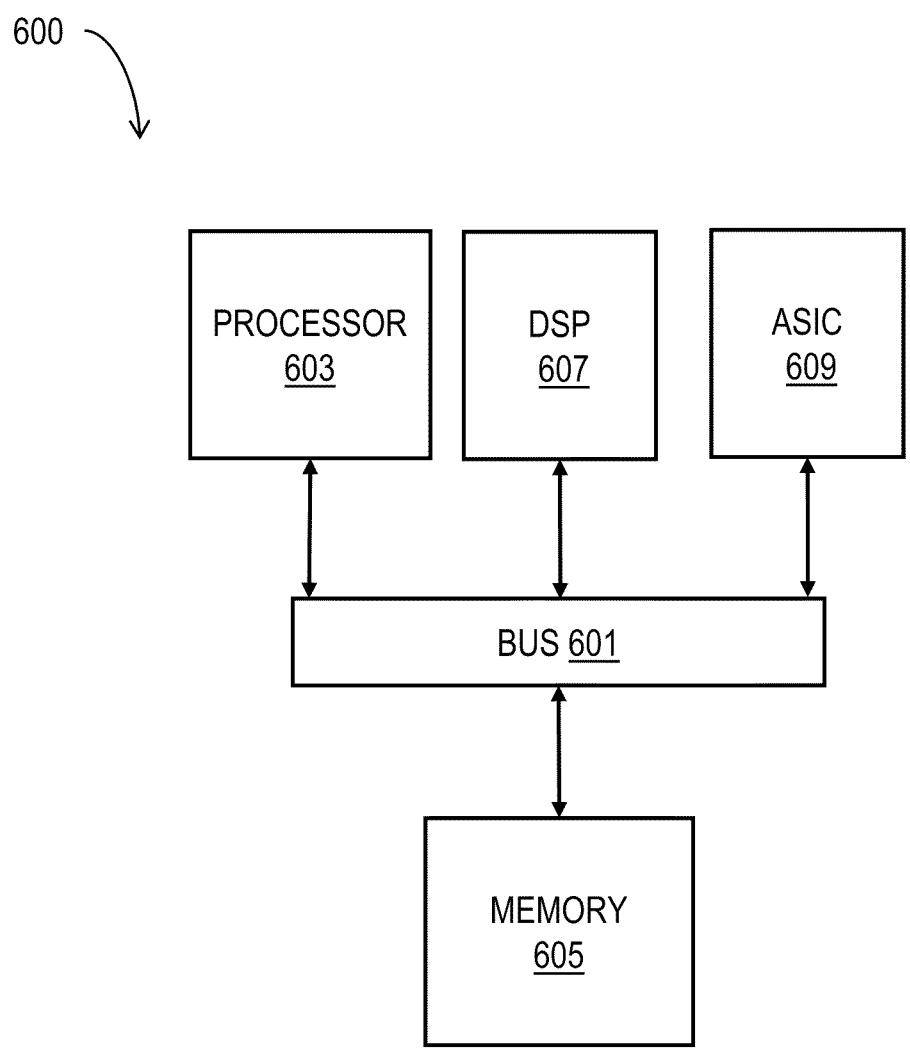
FIG. 6 is a diagram of a chip set that can be used to implement an embodiment of the invention.

FIG. 6 illustrates a chip set 600 upon which an embodiment of the invention may be implemented. Chip set 600 is programmed for robust, flexible classification of content as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to robust, flexible classification of content. The memory 605 also stores the data associated with or generated by the execution of the inventive steps.

Figure 7:
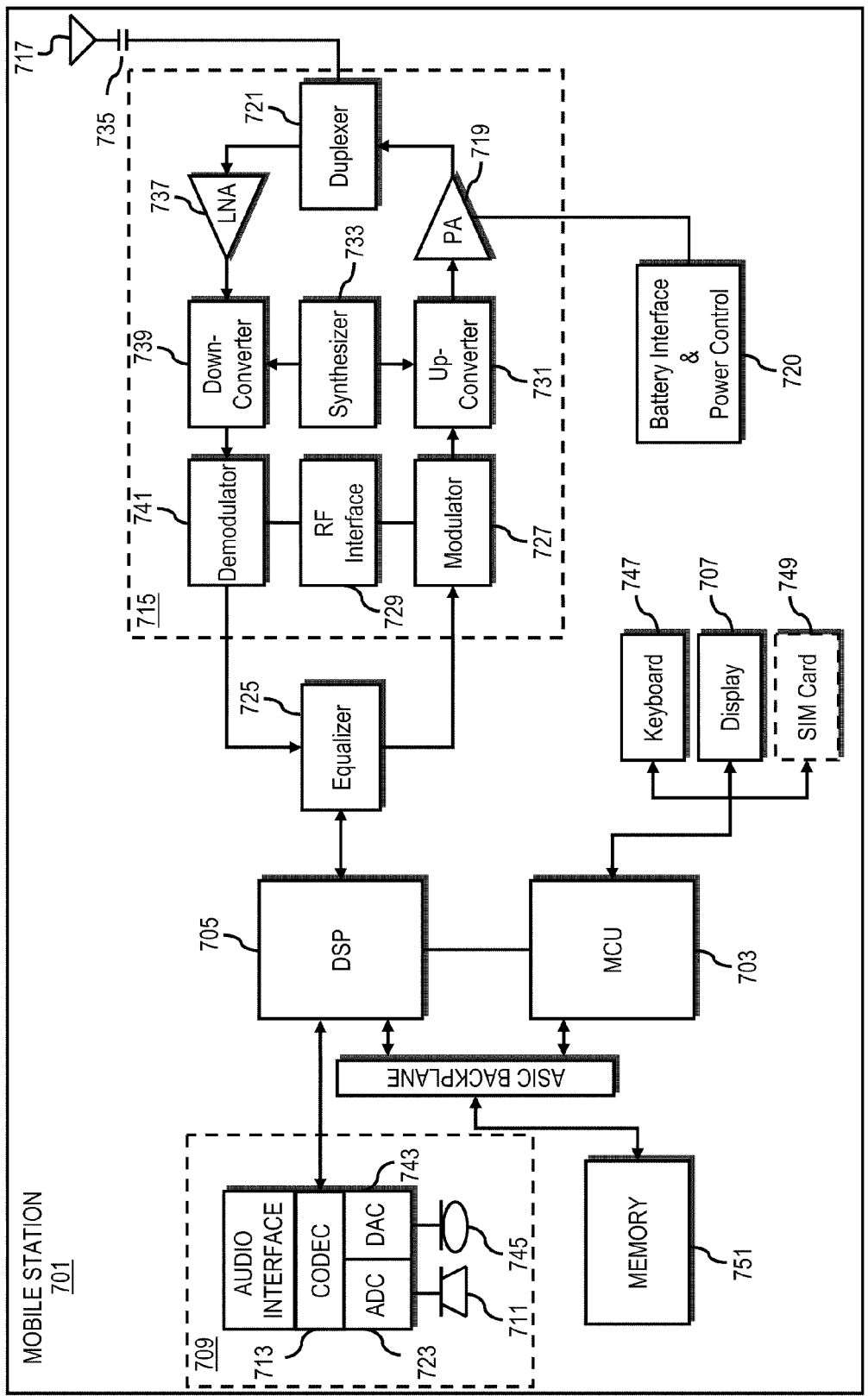
FIG. 7 is a diagram of a mobile station (e.g., handset) that can be used to implement an embodiment of the invention.

FIG. 7 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions that offer automatic contact matching. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile station 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile station 701 for robust, flexible classification of content. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, in association with a first content to be rendered on user equipment, a first vector, the first vector being a first combination of relative positional values along corresponding sliding scales;
determining a relevance between the first content and a second content based, at least in part, on a mathematical distance in a vector space between the first vector and a second vector associated with the second content, the second vector being a second combination of relative positional values along the corresponding sliding scales; and
based on the determination, initiating a rendering of the second content on the user equipment,
wherein each of the corresponding sliding scales has a minimum label and a maximum label, and the second vector corresponds to a subspace of the vector space, and the subspace is used to classify the first vector,
wherein the corresponding sliding scales comprise two or more interlocked scales, the interlocked scales moving concurrently when there is a change to any of the interlocked scales, and
wherein the method comprises sending data indicating the minimum label and the maximum label for each of the sliding scales, wherein the first vector is received in response to sending the data indicating the minimum label and the maximum label.

2. The method of claim 1, further comprising receiving initialization data that indicates the minimum label and the maximum label for each of the sliding scales.

3. The method of claim 1, wherein sending the data indicating the minimum label and the maximum label further comprises sending at least one of data that indicates a method for rendering the sliding scales and data that indicates a granularity for reporting the relative position along the corresponding sliding scale.

4. The method of claim 1, further comprising receiving, in association with the second content to be rendered on user equipment, the second vector.

5. The method of claim 1, wherein the relevance is expressed according to at least one of a classification for the first content and a measure of relevance of the first content for the second content.

6. The method of claim 1, further comprising making a recommendation to a user about content based on the relevance of the first content to the second content.

7. The method of claim 1, further comprising storing the first vector in association with metadata about the first content.

8. An apparatus comprising:
a processor; and
a memory storing computer program code, the computer program code configured to, when executed by the processor, direct the apparatus to:
receive, in association with a first content to be rendered on user equipment, a first vector, the first vector being a first combination of relative positional values along corresponding sliding scales;
determine a relevance between the first content and a second content based, at least in part, on a mathematical distance in a vector space between the first vector and a second vector associated with the second content, the second vector being a second combination of relative positional values along the corresponding sliding scales; and
based on the determination, initiating a rendering of the second content on the user equipment,
wherein each of the corresponding sliding scales has a minimum label and a maximum label, and the second vector corresponds to a subspace of the vector space, and the subspace is used to classify the first vector,
wherein the corresponding sliding scales comprise two or more interlocked scales, the interlocked scales moving concurrently when there is a change to any of the interlocked scales, and
wherein the computer program code is configured to direct the apparatus to send data indicating the minimum label and the maximum label for each of the sliding scales, and the first vector is received in response to sending the data indicating the minimum label and the maximum label.

9. The apparatus of claim 8, wherein the computer program code is configured to direct the apparatus to receive initialization data that indicates the minimum label and the maximum label for each of the sliding scales.

10. The apparatus of claim 8, wherein the computer program code is configured to direct the apparatus to send the data indicating the minimum label and the maximum label by sending at least one of data that indicates a method for rendering the sliding scales and data that indicates a granularity for reporting the relative position along the corresponding sliding scale.

11. The apparatus of claim 8, wherein the computer program code is configured to direct the apparatus to receive, in association with the second content to be rendered on user equipment, the second vector.

12. The apparatus of claim 8, wherein the relevance is expressed according to at least one of a classification for the first content and a measure of relevance of the first content for the second content.

13. The apparatus of claim 8, wherein the computer program code is configured to direct the apparatus to make a recommendation to a user about content based on the relevance of the first content to the second content.

14. The apparatus of claim 8, wherein the computer program code is configured to direct the apparatus to store the first vector in association with metadata about the first content.

15. A method comprising:
receiving, in association with a first content to be rendered on user equipment, a first vector, the first vector being associated with the first content and being a first combination of relative positional values along corresponding sliding scales;
transmitting data indicating a relevance between the first content and a second content based, at least in part, on a mathematical distance in a vector space between the first vector and a second vector associated with the second content, the second vector being a second combination of relative positional values along the corresponding sliding scales; and based on the determination, initiating a rendering of the second content on the user equipment, wherein each of the corresponding sliding scales has a minimum label and a maximum label, and the second vector corresponds to a subspace of the vector space, and the subspace is used to classify the first vector, wherein the corresponding sliding scales comprise two or more interlocked scales, the interlocked scales moving concurrently when there is a change to any of the interlocked scales, and wherein facilitating comprises sending data indicating the minimum label and the maximum label for each of the sliding scales, and wherein the first vector is received in response to sending the data indicating the minimum label and the maximum label.

16. The method of claim 15, wherein initialization data is received, and the initialization data indicates the minimum label and maximum label for each of the sliding scales.

17. The method of claim 15, wherein the first vector of values is stored in association with metadata about the first content.

* * * * *